United States Patent [19]

Hehl

[11] Patent Number: 4,485,661

[45] Date of Patent: Dec. 4, 1984

[54] DEEP-DRAWING END EDGE-TRIMMING DIE

[76] Inventor: Karl Hehl, Arthur-Hehl-Strasse 32, 7298 Lossburg 1, Fed. Rep. of Germany

[21] Appl. No.: 418,801

[22] Filed: Sep. 16, 1982

[30] Foreign Application Priority Data

Sep. 16, 1981 [DE] Fed. Rep. of Germany ....... 3136753

[51] Int. Cl.³ .................... B21D 28/00; B21D 28/14
[52] U.S. Cl. ..................................... 72/332; 72/326; 72/350; 72/464; 72/327
[58] Field of Search ........................... 72/332–337, 72/326, 327, 464, 381, 382, 350, 351; 83/185, 186, 190, 191, 914

[56] References Cited

U.S. PATENT DOCUMENTS

| | | | |
|---|---|---|---|
| 1,766,217 | 6/1930 | Booth | 72/334 |
| 1,807,824 | 6/1931 | Booth | 72/334 |
| 1,857,628 | 5/1932 | Eisenlohr | 72/336 |
| 1,965,228 | 7/1934 | Gabriel | 83/190 |
| 2,212,874 | 8/1940 | Brehm | 83/186 |
| 2,371,138 | 3/1945 | Harrison et al. | 72/332 |
| 2,521,974 | 9/1950 | Hartup | 83/190 |
| 2,521,975 | 9/1950 | Hartup | 83/125 |
| 2,629,439 | 2/1953 | Hartup | 83/190 |
| 2,828,632 | 4/1958 | Boultinghouse et al. | 74/435 |
| 2,898,996 | 8/1959 | Huser | 83/190 |
| 3,057,042 | 10/1962 | Lawson | 72/333 |
| 3,104,577 | 9/1963 | Callison | 83/185 |
| 3,192,761 | 7/1965 | Hoskins | 72/464 |
| 3,748,791 | 7/1973 | Foster | 83/191 |
| 4,309,888 | 1/1982 | Miller et al. | 72/334 |

FOREIGN PATENT DOCUMENTS

1050294 2/1959 Fed. Rep. of Germany ........ 72/335

Primary Examiner—Daniel C. Crane
Attorney, Agent, or Firm—Joseph A. Geiger

[57] ABSTRACT

A deep-drawing and edge-trimming tool assembly for the shaping of workpieces with an upstanding peripheral edge flange and the subsequent trimming of the outer edge of the edge flange, the assembly comprising a vertically and horizontally movable bolster plate carrying a pressure ring and a drawing ring which cooperates with a stationary drawing punch arranged above the bolster plate, so that the drawing ring is movable downwardly, for a deep-drawing operation and, in its lowermost position, is also movable horizontally in four directions, for a sequential edge trimming operation, in cooperation with the lower peripheral edge of the stationary drawing punch.

17 Claims, 5 Drawing Figures

DEEP-DRAWING END EDGE-TRIMMING DIE

BACKGROUND OF THE INVENTION

1. Field of the Invention

The present invention relates to deep-drawing dies for the shaping of steel sheet blanks into parts which have an upstanding edge flange and, more particularly, to a deep-drawing tool which is also capable of trimming the height of the deep-drawn edge flange.

2. Description of the Prior Art

In conventional deep-drawing tools of this type, the advancing drawing punch draws the blank into the drawing ring. The deformation of the sheet involves a combination of tensile and compression stresses. The blank portion which is located outside the drawing diameter and which is to be deformed, is subjected to a clamping action, in order to prevent folding and buckling of the blank during drawing. The drawing action on the metal may result in an uneven outer edge of the edge flange, especially when the circumference of the deep-drawn part is non-circular. In this case, it will be necessary to trim the outer edge of the edge flange in a subsequent cutting operation, for which a special edge-trimming tool is required.

SUMMARY OF THE INVENTION

Underlying the present invention is the primary objective of suggesting an improved deep-drawing tool of the above-mentioned type which combines the operational capabilities of deep-drawing and edge-trimming and which, therefore, does not require a separate edge-trimming tool and associated production machinery, thereby also eliminating the additional step of transferring the workpieces from the deep-drawing press to the edge-trimming machine.

The present invention proposes to attain this objective by suggesting an improved deep-drawing tool in which the bolster plate, the pressure ring and the deep-drawing ring form a unit which is displaceable transversely to the drawing direction, while cutting edges are provided on the stationary punch and on the drawing ring, in order to produce a shearing action on the upstanding edge flange of the work piece. Such a combined deep-drawing and edge-trimming die has several advantages: While reducing costs in terms of investment for tooling and machinery and saving floor space in the manufacturing plant, it also enhances the quality of the manufactured parts in terms of trimming accuracy, because the deep-drawn workpiece remains fully secured in its final deep-drawn position, as its outer edge is trimmed by the same tool components which perform the deep-drawing operation.

BRIEF DESCRIPTION OF THE DRAWINGS

A preferred embodiment of the invention will be described in the following with reference to the drawings, in which.

DESCRIPTION OF THE PREFERRED EMBODIMENT

Figure 2:
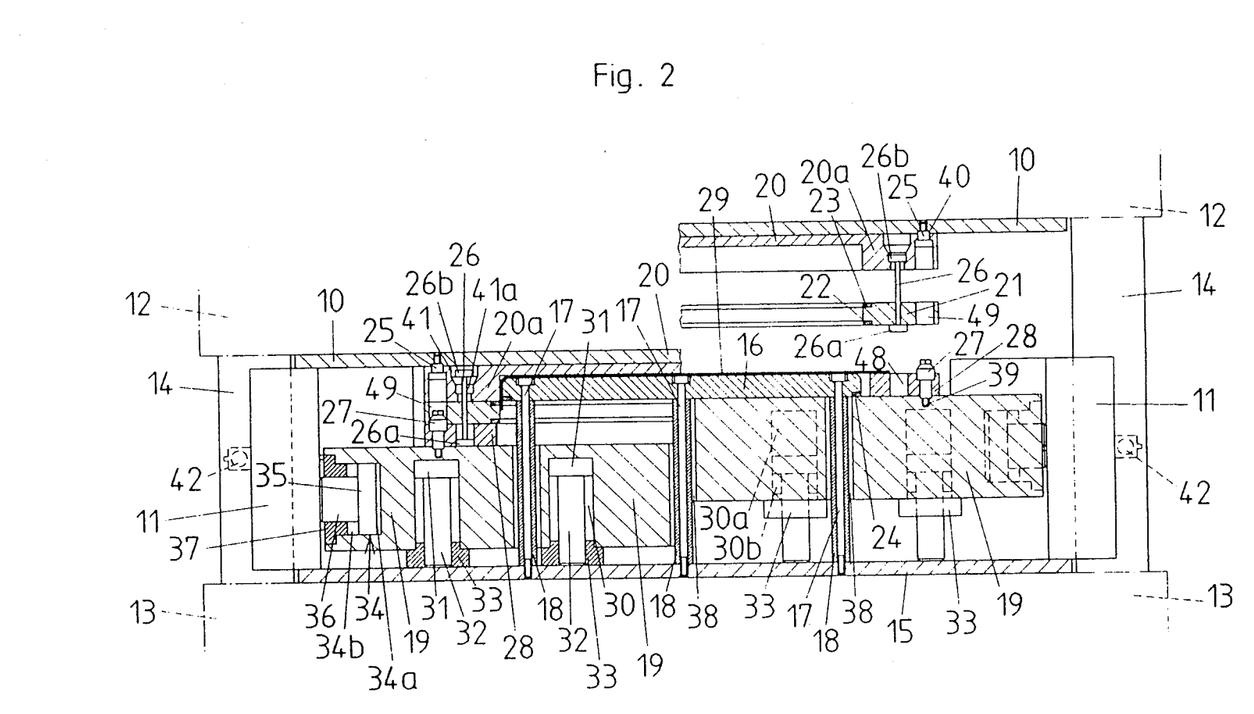
FIG. 2 shows the tool of FIG. 1 in a cross section taken along line II—II of FIG. 1, the tool positions at the beginning and end of the deep-drawing operation being shown in the right and left halves, respectively, of the figure.

As can be seen in FIG. 2, the deep-drawing and edge-trimming tool of the invention is designed for mounting in a vertical press. The upper platen 12 of this vertical press is guided on guide columns 14 which are anchored in the lower press platen 13. An upper die mounting plate 10 covers the entire working surface of the upper press platen 10 between the guide columns 14. A similar lower die mounting plate 15 is arranged on the lower press platen 13, carrying a movable bolster plate 19 by means of intermediate supporting members which will be described further below. Also supported on the lower die mounting plate 15 is a stationary deep-drawing punch 16. The latter is arranged above the bolster plate 19, being mounted on a number of spacer sleeves 18. Bolts 17 reach through the drawing punch 16 and the spacer sleeves 18 to produce a rigid connection between the drawing punch 16 and the lower die mounting plate 15. The heads of the bolts 17 are countersunk in the drawing punch 16. The spacer sleeves 18 thus extend through the bolster plate 19, the latter having appropriate throughbores 38 of a diameter which is considerably greater than the diameter of the spacer sleeves 18. The upper die mounting plate 10 carries a drawing ring 21 which is mounted on a drawing ring support 20. The latter has a flange-like axial collar 20a on its periphery which matches in diameter the drawing ring 21. A series of lifter pins 26 connect the drawing ring 21 to the drawing ring support 20. The lifter pins 26 have lower and upper heads 26a and 26b, respectively. By means of the upper heads 26b, the lifter pins 26 are held captive in countersunk bores of the collar 20a, and by means of their lower heads 26a, they carry the drawing ring 21, when the upper press platen 12 is raised (right-hand side of FIG. 2). In the lowered position of the upper press plate 12 (left-hand side of FIG. 2), the upper heads 26b of the lifter pins 26 are raised in relation to the countersunk bores of the collars 20a, so that an annular gap 41 exists between the bores and the lifter pins 26 in all diameters. In the ring-carrying position, the upper heads 26b of the lifter pins 26 are engaged in a centering recess of the drawing ring support, being centered and supported by a narrow shoulder. The shafts of the lifter pins 26 extend with minimal clearance through bores of the drawing ring 21. As the latter approaches the pressure ring 28, the lower heads 26a of the lifter pins 26 descend into bores 48 in the pressure ring 28. This arrangement allows for a limited vertical movement of the drawing ring 21 relative to the drawing ring 20, as well as for transverse displacements of the drawing ring 20 and the pressure ring 28 in the closed position of the tool. The vertical freedom of the drawing ring 21 is determined by the length of the lifter pins 26, the transverse mobility of the rings 20 and 28 is limited by the annular gap 41 between the lifter pins 26 and the stepped bores in the collar 20a.

Figure 1:
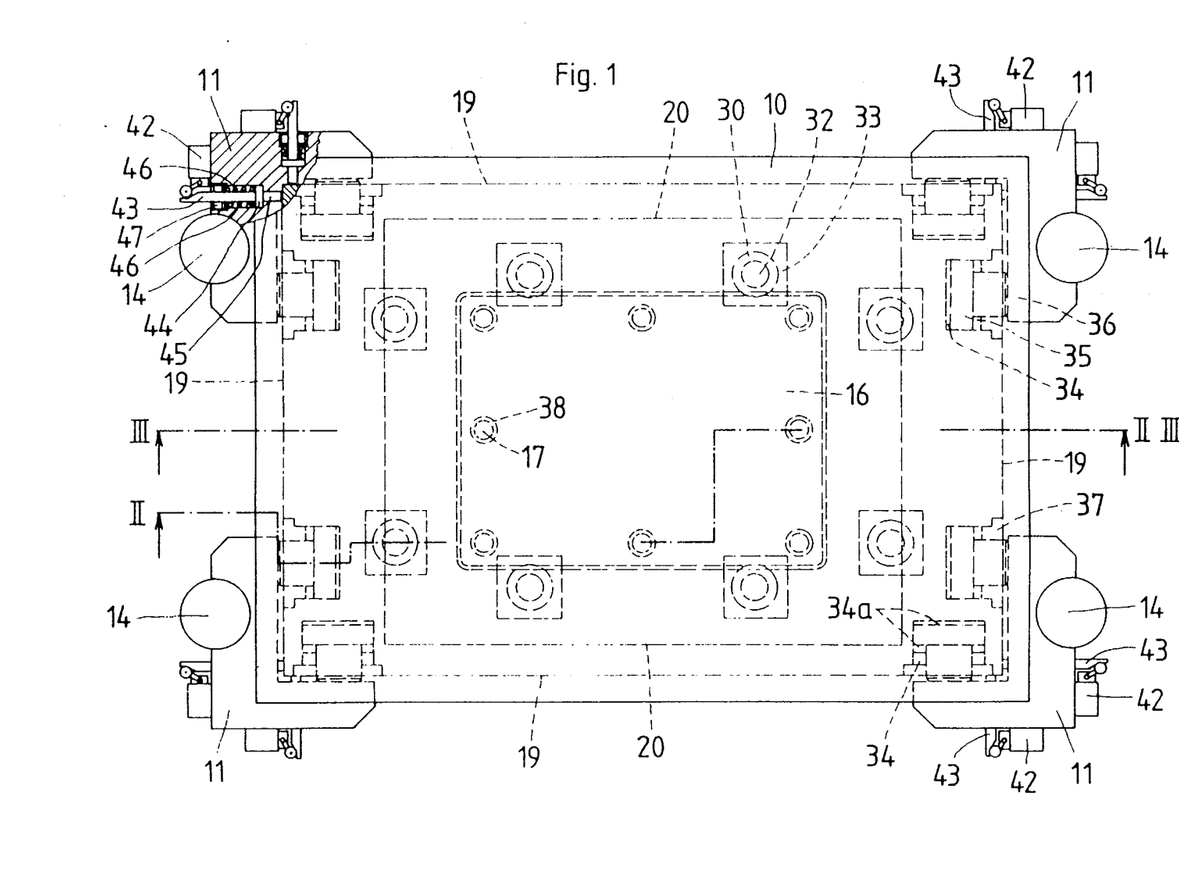
FIG. 1 shows the deep-drawing and edge-trimming tool of the invention in a plan view.
Figure 3:
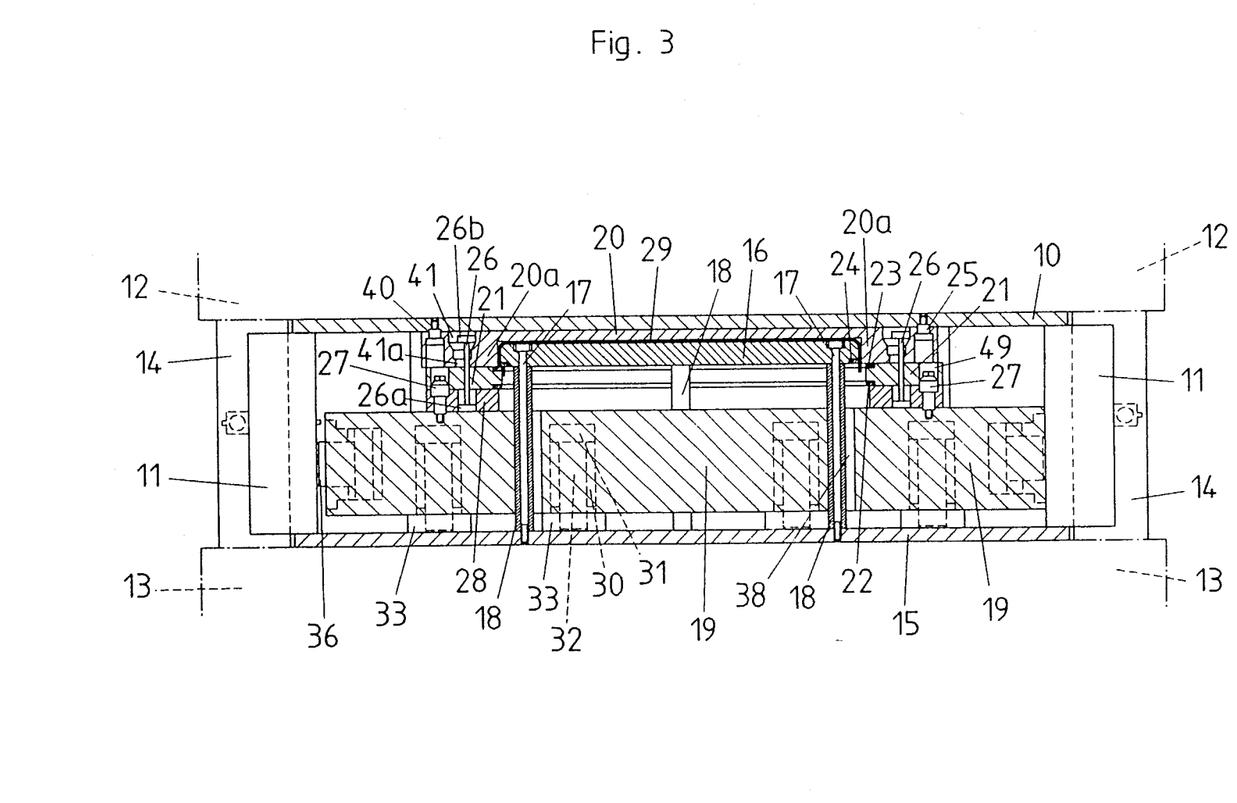
FIG. 3 shows a cross section of the tool of FIG. 1, taken along line III—III thereof, in a position in which the edge trimming operation is performed.

As can be seen in FIG. 1, the bolster plate 19 is in the form of a one-piece rectangular block, covering substantially the entire working surface of the lower press platen 13. The bolster plate 19 is freely supported on the lower die mounting plate 15 by means of a number of hydraulic cylinder assemblies whose downwardly extending piston rods 32 ride with their extremities on the lower die mounting plate 15. Each cylinder assembly consists of a vertically oriented blind cylinder bore 30 cooperating with a piston 31 on the piston rod 32, so as to form a pressure space 30a. Cylinder covers 33 guide the piston rods 32. The pressure plate 28 is fixedly mounted on top of the bolster plate 19 by means of a number of special centering fasteners 27. The latter engage threaded bores and centering recesses 39 in the bolster plate 19 and, by means of enlarged upwardly tapered head portions which are partially recessed into the upper surface of the pressure ring 28, clamp the latter against the bolster plate 19. As the drawing ring 21 is lowered over the pressure ring 28, centering bores 49 in the drawing ring 21 engage the head portions of the centering fasteners 27, thereby precisely positioning the drawing ring 21 in relation to the bolster plate 19 (FIG. 3). In this position, the drawing ring 21 and the pressure ring 28 are in centered alignment.

In the open position of the tool, prior to the deep-drawing operation, the sheet metal blank 29 is positioned and centered on top of the drawing punch 16, having a peripheral blank portion which extends on all sides a distance beyond the drawing punch 16, so as to rest on the pressure ring 28 which surrounds the drawing punch 16 in this tool position (right-hand side of FIG. 2). In the process of the deep-drawing stroke, the upper press platen 12 is forcibly lowered, thereby also lowering the upper die mounting plate 10, the drawing ring support 20 and the drawing ring 21 against the lower press platen 13. For the production of large parts of heavy-gauge sheet metal, such as, for example, rectangular safety gates for injection molding machines with circumferential upstanding edge flanges, the operating pressure of the vertical press may be 400 tons. As the drawing ring 21 moves downwardly, its centering bores 49 are engaged by the centering fasteners 27, before the ring comes to rest on top of the peripheral portion of the sheet metal blank 29 which reaches over the pressure ring 28. At the same time, the lower heads 26a of the lifter pins 26 move into the bores 48 of the pressure ring 28, until they abut against the upper surface of the bolster plate 19. As the upper press platen 12 continues its downward movement, the drawing ring support 20 comes to bear against the drawing ring 21, while the upper heads 26b of the lifter pins 26 are freed from their centering recesses. The downward force of the upper press platen 12 now bears against the drawing ring 21, in opposition to the pressure ring 28 and its supporting bolster plate 19, thereby clamping the peripheral portion of the blank 29. This clamping force is controlled by the hydraulic pressure in the pressure spaces 30a of the vertical cylinder assemblies 30–33. The further downward movement of the upper press platen 12 causes the vertical cylinder assemblies to contract, as hydraulic fluid is forcibly expelled from their upper pressure spaces 30a, whereby the drawing edge of the drawing ring 21 moves along the vertical surface of the drawing punch 16, until the peripheral edge portion of the blank 29 is deformed and drawn into a vertical orientation, as is shown in the left-hand portion of FIG. 2. For the earlier-mentioned example of the manufacture of a safety gate with deep-drawn edge flanges, the counter-pressure on the bolster plate 19 may be 100 tons. This counter-pressure is readily adjustable by adjusting the throttling action on the hydraulic fluid which is expelled from the upper pressure spaces of the vertical cylinder assemblies 30–33. Such a tool makes is possible to produce rectangular panels with deep-drawn edge flanges of relatively small corner radii.

In the fully closed position of the deep-drawing tool, the upper die mounting plate 10 abuts against the lower die mounting plate 15, via abutment blocks 11 in the four corners of the tool assembly. In this position, the drawing ring 21 abuts against the pressure ring 28, the peripheral portion of the blank 29, which had previously been clamped between them, now being fully deformed into a vertically oriented edge flange. With the upward pressure on the bolster plate 19 relaxed, the movement unit consisting of the bolster plate 19, the pressure ring 28 and the drawing ring 21, is now free to execute short horizontal displacements, in order to produce an edge-trimming operation on the upstanding edge flange of the workpiece. These horizontal edge-trimming displacements need only be slightly greater than the sheet metal gauge of the workpiece. In order to accommodate these displacements, the throughbores 38 in the bolster plate 19 are correspondingly larger than the diameter of the spacer sleeves 18, and the lifter pins 26 have a corresponding annular gap 41 with the stepped bores of the drawing ring support 20. All horizontal movements of the bolster plate 19 are rigidly transmitted to the drawing ring 21, which thereby moves in relation to the drawing punch 16 and the surrounding edge flange of the workpiece, as is shown in FIG. 3. The lower peripheral edge of the drawing punch 16 thus serves as a cutting edge, being provided with a trimming edge insert 24 for this purpose. The drawing ring 21 carries a similar trimming edge insert 23. The rectangular trimming edge insert 24 of the drawing punch 16 and the cooperating rectangular trimming edge insert 23 of the drawing ring 21, as well as its drawing edge insert 22, are of special tool steel, in order to minimize tool wear. The upper side of the trimming edge insert 23 is flush with the upper side of the drawing ring 21, and it moves in shearing alignment with the lower side of the trimming edge insert 24 of the stationary drawing punch 16. The edge-trimming displacements of the horizontally movable unit 19, 21 and 28 are produced on the bolster plate 19 by means of four pairs of horizontally oriented hydraulic cylinder assemblies 34 (FIG. 1). As can best be seen in FIG. 4, each horizontal cylinder assembly consists of a blind bore in the bolster plate 19, a cooperating piston 35 on a piston rod 36, and a recessed cylinder cover 37 which is outwardly flush with the bolster plate 19. The extremities of the piston rods 36 are supported against vertical faces of the abutment blocks 11 in the four corners of the tool assembly. The abutment blocks 11, in turn, are backed up by the four guide columns 14 of the vertical press. The abutment blocks are additionally attached to the lower die mounting plate 15. On each of the four sides of the bolster plate 19 are thus arranged two matching hydraulic cylinder assemblies 34, so that displacements in both directions of both horizontal axes can be imparted on the movable edge-trimming unit of the tool assembly. By moving the latter sequentially in these four directions, it is possible, for example, to first trim the right-hand edge flange, then the left-hand edge flange, followed by the front edge flange and, lastly, the rear edge flange of the deep-drawn workpiece. The displacements of each pair of horizontal cylinder assemblies are controlled by limit switches 42 which are actuated by horizontally extending switch actuating pins 43. Each actuating pin 43 is biased against the bolster plate 19 by means of a compression spring 46 which engages a collar 44 of the actuating pin 43 and a threaded retaining plug 47 in the bore of the abutment block 11. The collars 44 of the actuating pins 43 limit their inward movements to the centered normal position of the bolster plate 19, so that, whenever the latter is displaced from its centered position, the two outwardly displaced switch actuating pins 43 tend to return the bolster plate 19 to its centered position. Following the completion of the edge-trimming operation through displacements of the bolster plate 19 in all four directions, the tool assembly is opened by raising the upper press platen 12 to its rest position which is shown on the right-hand side of FIG. 2, while the bolster plate 19 remains in its lowermost position. Following the removal of the deep-drawn and edge-trimmed workpiece and of the metal sliver which is produced by the edge-trimming operation, the bolster plate 19 is raised to its rest position in which it abuts against the underside of the drawing punch 16, while the upper side of the pressure ring 28 is flush with the upper side of the drawing punch 16 to receive a new sheet metal blank 29.

Figure 4:
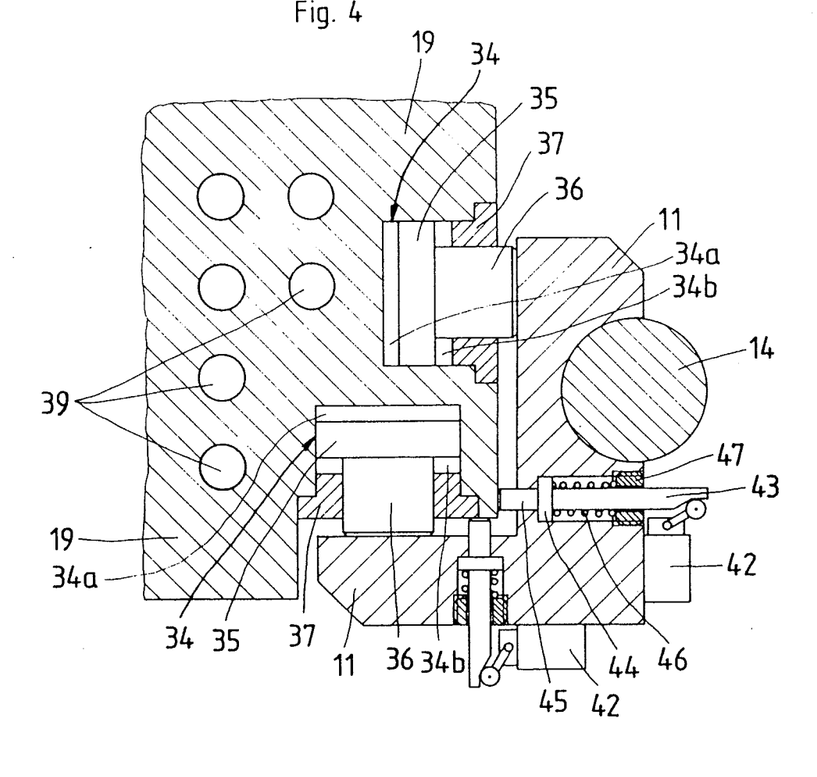
FIG. 4 shows, in a horizontal cross section, an enlarged corner detail of the tool of FIG. 1.

In order to make it possible to equip the deep-drawing and edge-trimming tool assembly of the invention with drawing rings 21 of different size, the upper die mounting plate 10 is provided with a number of centering bores 40 (FIG. 2) at standardized intervals. The centering bores are designed to receive the centering screws 25 of differently sized drawing ring supports 20. Correspondingly positioned centering bores 39 are arranged in the bolster plate 19, as can be seen in FIG. 4, for example. Similarly, the correspondingly sized drawing punches 16 require differently spaced throughbores 38 in the bolster plate 19 and threaded bores for the bolts 17.

Figure 5:
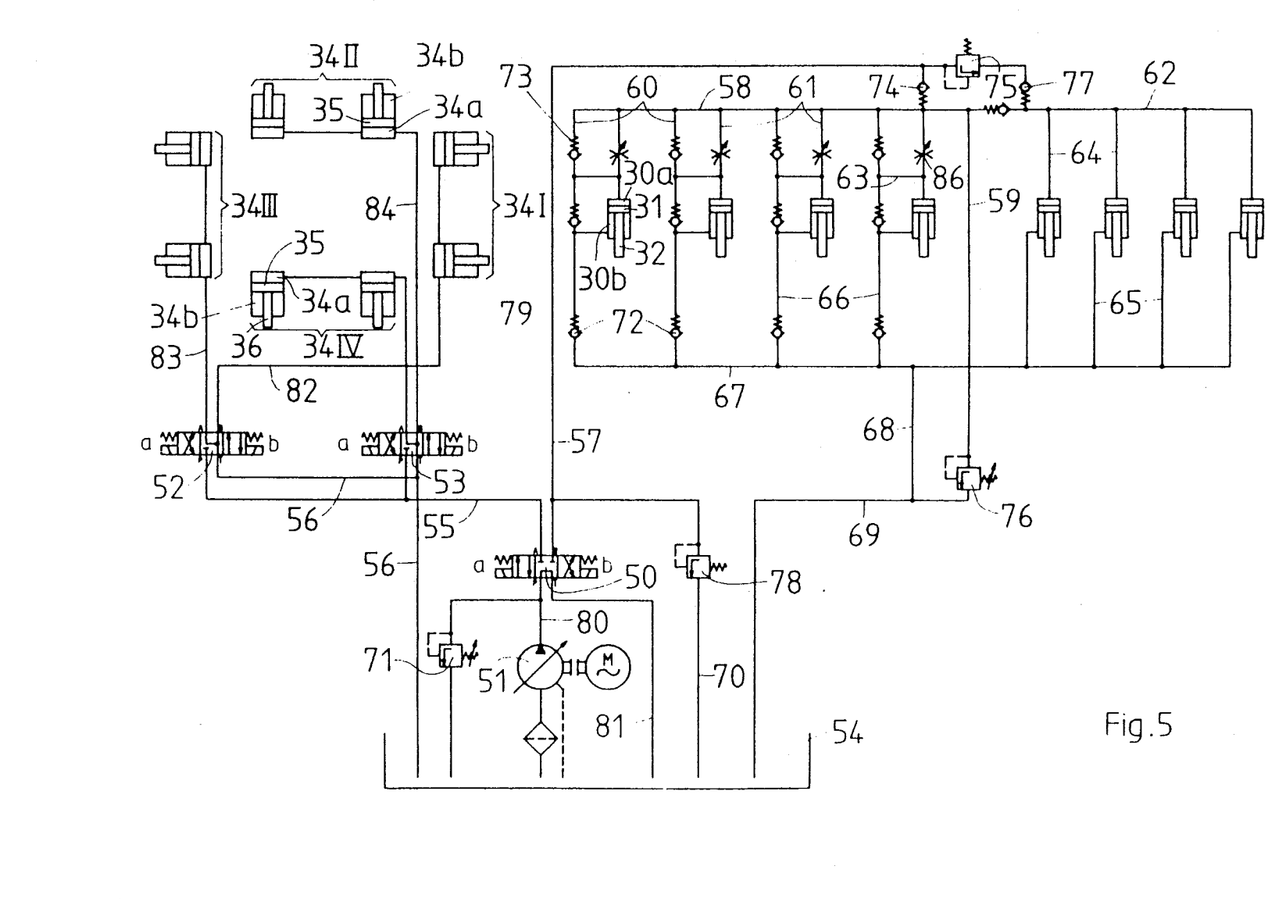
FIG. 5 shows, in the form of a circuit diagram, a hydraulic system for the deep-drawing and edge-trimming tool of FIG. 1.

Referring to FIG. 5, the operation of a hydraulic system for the proposed deep-drawing and edge-trimming tool assembly of the invention is as follows: Corresponding to the rest position of the tool assembly, as shown on the right-hand side of FIG. 2, is the zero-position of the main direction control valve 50 in which the pump 51 circulates hydraulic fluid in an idling mode over the hydraulic line 81 into the fluid reservoir 54.

The deep-drawing operation requires a counter-pressure action of the vertical cylinder assemblies in the bolster plate 19. This is accomplished by throttling the fluid, as it is passively displaced from the upper pressure spaces 30a of the cylinder assemblies, via the hydraulic lines 60, 58 and 59, and 64, 62 and 59, respectively, which lead to an adjustable throttle valve 76. The flow resistance of the latter determines the counter-pressure which is exerted on the pressure ring 28 by the eight vertical cylinder assemblies. The displaced fluid flows to the reservoir 54, via the return line 69. The correspondingly expanding lower pressure spaces 33b of the vertical cylinder assemblies produce a suction effect through which a smaller amount of fluid is drawn from the return line 69, via the connecting lines 68 and 67 or 65, respectively.

The main direction control valve 50 switches the fluid pump 51 between a circuit portion for the horizontal cylinder assemblies, in valve position a, and a circuit portion for the vertical cylinder assemblies, in valve position b. Accordingly, the main direction control valve 50 remains in position a in all four displacement modes of the horizontal cylinder assemblies 34 I through 34 IV. For an edge-trimming displacement at the right-hand side, the displacement control valve 52 is moved to its a-position, so that pressurized fluid reaches the cylinder group 34 I, via the line 82. The resultant pressure build-up in the pressure spaces 34a of the cylinder assemblies 34 I displaces the bolster plate 19 to the left, thereby cutting the right-hand edge flange of the workpiece. The fluid which is displaced from the shrinking pressure spaces 34a of the left-hand cylinder assemblies 34 III is simultaneously returned to the fluid reservoir 54, via the lines 83 and 56. The edge-trimming displacement is terminated by the left-hand limit switches 42 which return the displacement control valve 52 to its zero-position in which the pressure spaces 34a of the cylinder groups 34 I and 34 III are interconnected, so that the compression springs 46 of the left-hand switch actuating pins 43 are free to return the bolster plate 19 to its centered position.

For the edge-trimming operation on the left-hand side of the workpiece, the displacement control valve 52 is moved into its b-position, so that the cylinder group 34 III is activated and the bolster plate 19 is displaced to the right-hand side, as the two cylinder groups 34 III and 34 I operate in an analogously reversed sense.

The direction control valve 53 controls the bolster plate displacements for the edge-trimming operation on the front and rear sides of the workpiece, the a-position of the valve activating the rear cylinder assemblies 34 II, via the line 84, for a forward displacement of the bolster plate 19 and an edge-trimming operation on the rear edge flange, while the b-position of the displacement control valve 53 activates the cylinder group 34 IV for an edge-trimming operation on the front side of the workpiece.

When the bolster plate 19 is to be raised, following the preparation of the tool assembly for the insertion of a new blank, the main displacement control valve 50 is switched to its b-position, so that the pressure line 80 of the hydraulic pump 51 supplies pressurized fluid to the vertical cylinder assemblies, via line 57. The pressurized fluid is fed directly to four of the eight vertical cylinder assemblies, via a check valve 74 and four adjustable flow rate valves 86 which are balanced against each other to produce a synchronous extension of the piston rods 32, for a parallel upward displacement of the bolster plate 19. The expanding upper pressure spaces 30a of the vertical cylinder assemblies produce a reduction of the lower pressure spaces 30b, so that fluid is displaced from the latter. The check valves 72 prevent the return flow of this fluid to the reservoir 54, forcing it to flow into the upper pressure spaces 30a, via line 63 and a check valve. The result is a differential-piston action on these four vertical cylinder assemblies, so that, with a reduced supply of pressurized fluid, the bolster plate 19 is rapidly raised to its upper position. In this differential-piston operating mode, the effective area of the hydraulic cylinder assemblies is equal to the diameter of the piston rod 32.

As the bolster plate 19 is raised by the four differential-piston cylinder assemblies on the left-hand side of the circuit diagram, the other four cylinder assemblies on the right-hand side remain retracted, their piston rods 32 having been lifted off the lower die mounting plate 15. Following the full extension of the first group of cylinder assemblies, the pressure in the pressure line 57 increases sufficiently to overcome the pressure limit valve 75, so that pressurized fluid is now supplied to the second group of four cylinder assemblies, via the check valve 77 and the lines 62 and 64. These cylinder assemblies do not have a differential-piston arrangement, the displaced fluid from the lower pressure spaces 30b flowing to the reservoir 54, via lines 65, 68 and 69. Thus, the time required for the full extension of the second group of cylinder assemblies is considerably longer than the time required for the extension of the first group, but, since this extension takes place during the removal of the deep-drawn and trimmed workpiece and the insertion of a new blank, it represents no delay in the operational cycle. The pressure limit valves 71 and 78 are safety valves for the two branches of the hydraulic system, protecting the hydraulic pump 51 against overloading.

It should be understood, of course, that the foregoing disclosure describes only a preferred embodiment of the invention and that it is intended to cover all changes and modifications of this example of the invention which fall within the scope of the appended claims.

I claim the following:

1. A deep-drawing and edge-trimming tool assembly which is attachable to the upper and lower platens of a vertical press and designed to shape a sheet metal blank into a part with a main panel and a deep-drawn upstanding peripheral edge flange, the tool assembly comprising in combination:

a lower die mounting plate designed to be supported on the lower press platen;

a drawing punch fixedly attached to the lower die mounting plate and maintained at a vertical distance therefrom by means of at least one spacing member, the drawing punch having an outer peripheral contour determining the inner contour of the peripheral edge flange of the part and a vertical height at said contour determining the trimmed inner height of said edge flange, the contour of the drawing punch forming a drawing edge on the upper side of the drawing punch and a trimming edge on its lower side;

a bolster plate arranged vertically between the lower die mounting plate and the drawing punch, the bolster plate having an upper side and being guided for vertical movements between upper and lower end positions along a vertical movement axis; a pressure ring attached to the upper side of the bolster plate in such a way that, in the upper end position of the bolster plate, it surrounds the drawing punch, the pressure ring having an upper surface designed to engage a peripheral area on the lower side of the blank;

an upper die mounting plate designed to be supported on the upper press platen;

a drawing ring carried by the upper die mounting plate in vertical alignment with the drawing punch and the pressure ring on the bolster plate, the drawing ring having upper and lower sides and being movable vertically by the press from an upper end position at a distance above the drawing punch and the pressure ring to a lower end position, the drawing ring having an inner peripheral contour forming a drawing edge at its lower side which cooperates with the drawing edge of the drawing punch to produce a deep-drawing action on the blank, when the drawing ring moves vertically past the drawing punch in a closing movement of the press, said drawing ring contour further forming a trimming edge at its upper side which, in the lower end position of the drawing ring, is in shearing alignment with the trimming edge of the drawing punch, the lower surface of the drawing ring being designed to engage a peripheral area on the upper side of the blank, prior to and during the deep-drawing action;

means for raising the bolster plate from its lower end position to its upper end position, said bolster plate raising means being also operable to press the pressure ring against the drawing ring and against the peripheral area of the blank engaged therebetween during the deep-drawing action;

means for supporting the bolster plate on the lower die mounting plate in such a way that the bolster plate is free to execute horizontal displacements in its lower end position;

means defined by the drawing ring and the pressure ring for radially centering the drawing ring in relation to the pressure ring in their approached position;

means for attaching the drawing ring to the upper die mounting plate in such a way that the drawing ring is free to execute horizontal displacements in unison with the pressure ring on the bolster plate, when the drawing ring is in its lower end position and approached and centered to the pressure ring; and means fixed in relation to the lower press platen for horizontally displacing the bolster plate away from its vertical movement axis, when the drawing ring is in its lower end position and approached and centered to the pressure ring, thereby forcing the drawing ring to execute the same horizontal displacements as the bolster plate and to trim the deep-drawn edge flange in a horizontal shearing action between the aligned trimming edges of the drawing ring and of the drawing punch.

2. A tool assembly as defined in claim 1, wherein said bolster plate displacing means is operable to displace the bolster plate in multiple horizontal directions in accordance with a displacement pattern, such that a contour line circumscribed by the sum of all the positions reached by the trimming edge of the drawing ring in accordance with said displacement pattern lies within the contour of the trimming edge of the drawing punch, to effect progressive trimming of said edge flange along its entire periphery.

3. A tool assembly as defined in claim 1, wherein the bolster plate displacing means is operable to displace the bolster plate in opposite directions away from its vertical movement axis along two horizontal displacement axes oriented at right angles to each other; and the bolster plate displacing means includes a plurality of horizontally oriented hydraulic cylinder assemblies the longitudinal axes of which define said two horizontal displacement axes.

4. A tool assembly as defined in claim 3, wherein the bolster plate has four sides, as part of a generally rectangular outline;

the lower die mounting plate includes upstanding stationary abutment means facing the bolster plate on each of its four sides;

the bolster plate displacing means includes at least two horizontally oriented hydraulic cylinder assemblies on each of the four sides of the bolster plate;

the horizontal cylinder assemblies are of the single-acting type and so arranged that the cylinder assemblies on one side of the bolster plate operate in parallel opposition to the cylinder assemblies on the opposite side;

the cylinder assemblies expand longitudinally under pressurization, having an outer member in abutment with the stationary abutment means, so that, when the cylinder assemblies on one side of the bolster plate are pressurized, they displace the bolster plate away from the abutment means on that side and closer to the abutment means on the opposite side; and the abutment means are so arranged that the horizontal cylinder assemblies are shiftable in relation thereto, while in abutment therewith, in a direction which is perpendicular to the axes of the cylinder assemblies.

5. A tool assembly as defined in claim 4, wherein
the bolster plate displacing means further includes limit switches which are responsive to the horizontal displacements of the bolster plate towards and away from the abutment means, in the four directions of bolster plate displacement; and the bolster plate displacing means further includes a hydraulic control circuit with hydraulic lines linking the cylinder assemblies on opposite sides of the bolster plate in such a way that they cooperate which each other in the manner of double-acting cylinder assemblies generating two-directional displacements of the bolster plate along one of the two displacement axes, the hydraulic control circuit including a direction control valve for each of the two displacement axes.

6. A tool assembly as defined in claim 1, wherein
the bolster plate raising means includes a plurality of vertically oriented hydraulic cylinder assemblies which expand longitudinally under pressurization, whereby the lower extremities of the expanding cylinder assemblies bear downwardly against the lower die mounting plate to raise the bolster plate.

7. A tool assembly as defined in claim 1, wherein
the bolster plate raising means includes a plurality of vertically oriented hydraulic cylinder assemblies which comprise cylinder bores cooperating with pistons to form upper pressure spaces above the pistons, the pistons being attached to downwardly extending piston rods which bear against the lower die mounting plate to raise the bolster plate, whereby the introduction of pressurized fluid into said upper pressure spaces raises the bolster plate, and a controlled resistance to the expulsion of hydraulic fluid from said upper pressures spaces during the lowering of the bolster plate in a deep-drawing movement presses the pressure ring on the bolster plate against the drawing ring and against the peripheral area of the blank engaged therebetween.

8. A tool assembly as defined in claim 7, wherein
the bolster plate raising means has at least some of said vertical cylinder assemblies arranged to operate in a differential fashion, the cylinder assemblies further forming lower, annular pressure spaces below the pistons which are smaller than their upper pressure spaces, so that, when both pressure spaces of the cylinder assemblies receive pressurized fluid from a common source, they rapidly raise the bolster plate with a relatively small amount of fluid.

9. A tool assembly as defined in claim 8, wherein
the bolster plate raising means includes a hydraulic control circuit subdividing said vertical cylinder assemblies into a first group and a second group of cylinder assemblies, at least said first group of cylinder assemblies being operable in said differential fashion;

the hydraulic control circuit has valve means and connecting lines so arranged that, when the bolster plate is to be raised, the cylinder assemblies of the first group are operated in said differential fashion, receiving pressurized fluid into their upper and lower pressure spaces from a common source, while the cylinder assemblies of the second group are operated in a single-acting fashion, receiving pressurized fluid into their upper pressure spaces, with the result that they expand slower than the cylinder assemblies of the first group and are lifted off the lower die mounting plate; and the hydraulic control circuit has valve means and connecting lines so arranged that, when the bolster plate is to be lowered in a deep-drawing movement, the cylinder assemblies of both groups are operated in a single-acting fashion, whereby the expulsion of hydraulic fluid from the upper pressure spaces of all the cylinder assemblies is throttled to create an elevated pressure between the pressure ring and the drawing ring.

10. A tool assembly as defined in claim 1, wherein
the drawing ring attaching means includes: a drawing ring support which is fixedly attached to the upper die mounting plate, a set of vertical bores in the drawing ring support, an aligned set of vertical bores in the drawing ring, and a number of lifter pins engaging said aligned bores in the drawing ring support and in the drawing ring in such a way that, when the press is in its open position, the lifter pins suspend the drawing ring in its upper end position at a distance below the drawing ring support.

11. A tool assembly as defined in claim 10, wherein
the lifter pins have an elongated shaft portion and an enlarged head portion on one axial extremity engaging one set of vertical bores;

the bores engaged by the head portions of the lifter pins have a first length portion surrounding the shaft portions of the lifter pins with a diameter which provides sufficient clearance to accommodate the horizontal displacements of the drawing ring in which the latter trims the deep-drawn edge flange of the part, said engaged bores having an adjoining second length portion with a larger diameter matching the diameter of the head portions and serving as a centering seat therefor; and the lifter pins are movable axially in relation to the bores engaged by their head portions, so as to allow the drawing ring support to approach the drawing ring and the head portions of the lifter pins to leave the centering seats.

12. A tool assembly as defined in claim 11, wherein
said enlarged head portions are arranged on the upper extremities of the lifter pins and engage the vertical bores of the drawing ring support;

the lifter pins also have heads on their lower extremities, said head defining shoulders on which the lifter pins carry the drawing ring in said suspended position, at a distance from the drawing ring support; and the lifter pins are axially movable in relation to the drawing ring, their shaft portions being guided in its bores.

13. A tool assembly as defined in claim 1, wherein the drawing punch is attached to the lower die mounting plate by means of a plurality of threaded connecting bolts reaching downwardly through the bolster plate into threaded bores in the lower die mounting plate, the drawing punch being vertically positioned by means of spacer sleeves which surround the connecting bolts; and the bolster plate has vertical apertures for the spacer sleeves which are large enough to accommodate the horizontal displacements of the bolster plate by which the deep-drawn edge flange of the part is trimmed.

14. A tool assembly as defined in claim 13, wherein the lower die mounting plate has several sets of threaded bores for the attachment thereto of drawing punches of different horizontal dimensions;

the bolster plate has corresponding sets of vertical apertures for the spacer sleeves;

the drawing ring support is attached to the upper die mounting plate by means of a plurality of threaded fasteners engaging threaded bores in the upper die mounting plate; and the upper die mounting plate has several sets of threaded bores for the attachment thereto of drawing ring supports and drawing rings of correspondingly different horizontal dimensions.

15. A tool assembly as defined in claim 1, wherein the means for radially centering the drawing ring includes a plurality of vertically oriented centering fasteners extending above the pressure ring and matching vertically aligned centering holes in the drawing ring which enter into a centering engagement with the said fasteners, when the drawing ring moves downwardly against the pressure ring; and the centering fasteners also serve to clamp the pressure ring to the bolster plate, engaging threaded bores of the latter.

16. A tool assembly as defined in claim 1, wherein the drawing edge at the lower side of the inner peripheral contour of the drawing ring is formed by a drawing edge insert of a highly abrasion-resistant material.

17. A tool assembly as defined in claim 1, wherein the trimming edge on the upper side of the inner peripheral contour of the drawing ring is formed by a trimming edge insert of a highly resistant material; and the trimming edge on the lower side of the outer peripheral contour of the drawing punch is likewise formed by a trimming edge insert of a highly resistant material.

* * * * *